(12) United States Patent
Becker et al.

(10) Patent No.: US 12,333,240 B2
(45) Date of Patent: Jun. 17, 2025

(54) SYSTEMS AND PROCESSES OF EXTRACTING UNSTRUCTURED DATA FROM COMPLEX DOCUMENTS

(71) Applicant: ADP, Inc., Roseland, NJ (US)

(72) Inventors: Willian E. Becker, Porto Alegre (BR); Marco Antonio Carniel Furlanetto, Porto Alegre (BR); Daniel H. Freeman, Sugar Hill, GA (US); Natanael dos Santos Silva, Union City, NJ (US); Kevin P. Glander, Cliffside Park, NJ (US); Vedang H. Joshi, Alpharetta, GA (US); Roberto Rodrigues Dias, Porto Alegre (BR); Marcos Camponogara, Cumming, GA (US)

(73) Assignee: ADP, Inc., Roseland, NJ (US)

( * ) Notice: Subject to any disclaimer, the term of this patent is extended or adjusted under 35 U.S.C. 154(b) by 161 days.

(21) Appl. No.: 17/506,108

(22) Filed: Oct. 20, 2021

(65) Prior Publication Data

US 2023/0121351 A1    Apr. 20, 2023

(51) Int. Cl.
*G06F 40/258* (2020.01)
*G06F 16/353* (2025.01)
*G06F 40/18* (2020.01)

(52) U.S. Cl.
CPC ............ *G06F 40/18* (2020.01); *G06F 16/353* (2019.01); *G06F 40/258* (2020.01)

(58) Field of Classification Search
CPC ...... G06F 40/18; G06F 16/353; G06F 40/258; G06F 40/106; G06F 40/177; G06F 21/105; G06F 16/258; G06F 40/295; G06F 16/358; G06N 3/08; G06N 3/045; G06N 5/027; G06N 5/022; G06N 5/046; G06N 20/00; G06V 30/413; G06V 30/416
USPC ........................................................ 715/217
See application file for complete search history.

(56) References Cited

U.S. PATENT DOCUMENTS

| | | | |
|---|---|---|---|
| 10,599,627 B2* | 3/2020 | Singh | G06F 16/25 |
| 2018/0341839 A1* | 11/2018 | Malak | G06F 40/205 |
| 2020/0019603 A1* | 1/2020 | Zorn | G06N 3/04 |
| 2020/0218851 A1* | 7/2020 | O'Donovan | G06F 8/38 |
| 2021/0256097 A1* | 8/2021 | Jayaraman | G06N 5/046 |

FOREIGN PATENT DOCUMENTS

WO    WO-2021097474 A1 *  5/2021  ......... G06K 9/00449

* cited by examiner

*Primary Examiner* — Rinna Yi
(74) *Attorney, Agent, or Firm* — Foley & Lardner LLP

(57) ABSTRACT

The present disclosure relates generally to data extraction of complex documents and, more particularly, to systems, processes and computer program products configured to automatically extract unstructured data from complex documents and perform table understanding on the extracted data. For example, the method includes: detecting, by the computer system, one or more tables within a digitized document; classifying, by the computer system, the one or more detected tables into at least a first table type; identifying, by the computer system, headers within the first table type; extracting, by the computer system, data within the headers and body cells of the first table type; and mapping, by the computer system, a relationship between the extracted data within the headers and the body cells.

19 Claims, 13 Drawing Sheets

What are the 2020 benefit plans and costs?

Medical Insurance Summary

Full Network (includes BJC providers)

— 410

Select Network (No BJC providers)

FIG. 4E

| Spouse Coverage Amounts and Monthly Premiums | | | | | | | | | | | | | |
|---|---|---|---|---|---|---|---|---|---|---|---|---|---|
| Age | <20 | 20-24 | 25-29 | 30-34 | 35-39 | 40-44 | 45-49 | 50-54 | 55-59 | 60-64 | 65-69 | 70-74 | 75+ |
| $5,000 | $0.28 | $0.28 | $0.34 | $0.45 | $0.51 | $0.65 | $0.97 | $1.49 | $2.77 | $4.26 | $8.20 | $13.29 | $25.00 |
| $10,000 | $0.56 | $0.56 | $0.67 | $0.90 | $1.01 | $1.29 | $1.93 | $2.97 | $5.54 | $8.51 | $16.39 | $26.58 | $50.00 |
| $15,000 | $0.84 | $0.84 | $1.01 | $1.35 | $1.52 | $1.94 | $2.90 | $4.46 | $8.31 | $12.77 | $24.59 | $39.87 | $75.00 |
| $20,000 | $1.12 | $1.12 | $1.34 | $1.80 | $2.02 | $2.58 | $3.86 | $5.94 | $11.08 | $17.02 | $32.78 | $53.16 | $100.00 |
| $25,000 | $1.40 | $1.40 | $1.68 | $2.25 | $2.53 | $3.23 | $4.83 | $7.43 | $13.85 | $21.28 | $40.98 | $66.45 | $125.00 |
| $30,000 | $1.68 | $1.68 | $2.01 | $2.70 | $3.03 | $3.87 | $5.79 | $8.91 | $16.62 | $25.53 | $49.17 | $79.74 | $150.00 |
| $35,000 | $1.96 | $1.96 | $2.35 | $3.15 | $3.54 | $4.52 | $6.76 | $10.40 | $19.39 | $29.79 | $57.37 | $93.03 | $175.00 |
| $40,000 | $2.24 | $2.24 | $2.68 | $3.60 | $4.04 | $5.16 | $7.72 | $11.88 | $22.16 | $34.04 | $65.56 | $106.32 | $200.00 |
| $45,000 | $2.52 | $2.52 | $3.02 | $4.05 | $4.55 | $5.81 | $8.69 | $13.37 | $24.93 | $38.30 | $73.76 | $119.61 | $225.00 |
| $50,000 | $2.80 | $2.80 | $3.35 | $4.50 | $5.05 | $6.45 | $9.65 | $14.85 | $27.70 | $42.55 | $81.95 | $132.90 | $250.00 |
| $55,000 | $3.08 | $3.08 | $3.69 | $4.95 | $5.56 | $7.10 | $10.62 | $16.34 | $30.47 | $46.81 | $90.15 | $146.19 | $275.00 |
| $60,000 | $3.36 | $3.36 | $4.02 | $5.40 | $6.06 | $7.74 | $11.58 | $17.82 | $33.24 | $51.06 | $98.34 | $159.48 | $300.00 |
| $65,000 | $3.64 | $3.64 | $4.36 | $5.85 | $6.57 | $8.39 | $12.55 | $19.31 | $36.01 | $55.32 | $106.54 | $172.77 | $325.00 |
| $70,000 | $3.92 | $3.92 | $4.69 | $6.30 | $7.07 | $9.03 | $13.51 | $20.79 | $38.78 | $59.57 | $114.73 | $186.06 | $350.00 |
| $75,000 | $4.20 | $4.20 | $5.03 | $6.75 | $7.58 | $9.68 | $14.48 | $22.28 | $41.55 | $63.83 | $122.93 | $199.35 | $375.00 |
| $80,000 | $4.48 | $4.48 | $5.36 | $7.20 | $8.08 | $10.32 | $15.44 | $23.76 | $44.32 | $68.08 | $131.12 | $212.64 | $400.00 |
| $85,000 | $4.76 | $4.76 | $5.70 | $7.65 | $8.59 | $10.97 | $16.41 | $25.25 | $47.09 | $72.34 | $139.32 | $225.93 | $425.00 |
| $90,000 | $5.04 | $5.04 | $6.03 | $8.10 | $9.09 | $11.61 | $17.37 | $26.73 | $49.86 | $76.59 | $147.51 | $239.22 | $450.00 |
| $95,000 | $5.32 | $5.32 | $6.37 | $8.55 | $9.60 | $12.26 | $18.34 | $28.22 | $52.63 | $80.85 | $155.71 | $252.51 | $475.00 |
| $100,000 | $5.60 | $5.60 | $6.70 | $9.00 | $10.10 | $12.90 | $19.30 | $29.70 | $55.40 | $85.10 | $163.90 | $265.80 | $500.00 |
| $105,000 | $5.88 | $5.88 | $7.04 | $9.45 | $10.61 | $13.55 | $20.27 | $31.19 | $58.17 | $89.36 | $172.10 | $279.09 | $525.00 |
| $110,000 | $6.16 | $6.16 | $7.37 | $9.90 | $11.11 | $14.19 | $21.23 | $32.67 | $60.94 | $93.61 | $180.29 | $292.38 | $550.00 |
| $115,000 | $6.44 | $6.44 | $7.71 | $10.35 | $11.62 | $14.84 | $22.20 | $34.16 | $63.71 | $97.87 | $188.49 | $305.67 | $575.00 |
| $120,000 | $6.72 | $6.72 | $8.04 | $10.80 | $12.12 | $15.48 | $23.16 | $35.64 | $66.48 | $102.12 | $196.68 | $318.96 | $600.00 |
| $125,000 | $7.00 | $7.00 | $8.38 | $11.25 | $12.63 | $16.13 | $24.13 | $37.13 | $69.25 | $106.38 | $204.88 | $332.25 | $625.00 |
| $130,000 | $7.28 | $7.28 | $8.71 | $11.70 | $13.13 | $16.77 | $25.09 | $38.61 | $72.02 | $110.63 | $213.07 | $345.54 | $650.00 |
| $135,000 | $7.56 | $7.56 | $9.05 | $12.15 | $13.64 | $17.42 | $26.06 | $40.10 | $74.79 | $114.89 | $221.27 | $358.83 | $675.00 |
| $140,000 | $7.84 | $7.84 | $9.38 | $12.60 | $14.14 | $18.06 | $27.02 | $41.58 | $77.56 | $119.14 | $229.46 | $372.12 | $700.00 |
| $145,000 | $8.12 | $8.12 | $9.72 | $13.05 | $14.65 | $18.71 | $27.99 | $43.07 | $80.33 | $123.40 | $237.66 | $385.41 | $725.00 |
| $150,000 | $8.40 | $8.40 | $10.05 | $13.50 | $15.15 | $19.35 | $28.95 | $44.55 | $83.10 | $127.65 | $245.85 | $398.70 | $750.00 |
| $155,000 | $8.68 | $8.68 | $10.39 | $13.95 | $15.66 | $20.00 | $29.92 | $46.04 | $85.87 | $131.91 | $254.05 | $411.99 | $775.00 |
| $160,000 | $8.96 | $8.96 | $10.72 | $14.40 | $16.16 | $20.64 | $30.88 | $47.52 | $88.64 | $136.16 | $262.24 | $425.28 | $800.00 |
| $165,000 | $9.24 | $9.24 | $11.06 | $14.85 | $16.67 | $21.29 | $31.85 | $49.01 | $91.41 | $140.42 | $270.44 | $438.57 | $825.00 |
| $170,000 | $9.52 | $9.52 | $11.39 | $15.30 | $17.17 | $21.93 | $32.81 | $50.49 | $94.18 | $144.67 | $278.63 | $451.86 | $850.00 |
| $175,000 | $9.80 | $9.80 | $11.73 | $15.75 | $17.68 | $22.58 | $33.78 | $51.98 | $96.95 | $148.93 | $286.83 | $465.15 | $875.00 |
| $180,000 | $10.08 | $10.08 | $12.06 | $16.20 | $18.18 | $23.22 | $34.74 | $53.46 | $99.72 | $153.18 | $295.02 | $478.44 | $900.00 |
| $185,000 | $10.36 | $10.36 | $12.40 | $16.65 | $18.69 | $23.87 | $35.71 | $54.95 | $102.49 | $157.44 | $303.22 | $491.73 | $925.00 |
| $190,000 | $10.64 | $10.64 | $12.73 | $17.10 | $19.19 | $24.51 | $36.67 | $56.43 | $105.26 | $161.69 | $311.41 | $505.02 | $950.00 |
| $195,000 | $10.92 | $10.92 | $13.07 | $17.55 | $19.70 | $25.16 | $37.64 | $57.92 | $108.03 | $165.95 | $319.61 | $518.31 | $975.00 |
| $200,000 | $11.20 | $11.20 | $13.40 | $18.00 | $20.20 | $25.80 | $38.60 | $59.40 | $110.80 | $170.20 | $327.80 | $531.60 | $1,000.00 |
| $205,000 | $11.48 | $11.48 | $13.74 | $18.45 | $20.71 | $26.45 | $39.57 | $60.89 | $113.57 | $174.46 | $336.00 | $544.89 | $1,025.00 |
| $210,000 | $11.76 | $11.76 | $14.07 | $18.90 | $21.21 | $27.09 | $40.53 | $62.37 | $116.34 | $178.71 | $344.19 | $558.18 | $1,050.00 |
| $215,000 | $12.04 | $12.04 | $14.41 | $19.35 | $21.72 | $27.74 | $41.50 | $63.86 | $119.11 | $182.97 | $352.39 | $571.47 | $1,075.00 |
| $220,000 | $12.32 | $12.32 | $14.74 | $19.80 | $22.22 | $28.38 | $42.46 | $65.34 | $121.88 | $187.22 | $360.58 | $584.76 | $1,100.00 |
| $225,000 | $12.60 | $12.60 | $15.08 | $20.25 | $22.73 | $29.03 | $43.43 | $66.83 | $124.65 | $191.48 | $368.78 | $598.05 | $1,125.00 |
| $230,000 | $12.88 | $12.88 | $15.41 | $20.70 | $23.23 | $29.67 | $44.39 | $68.31 | $127.42 | $195.73 | $376.97 | $611.34 | $1,150.00 |
| $235,000 | $13.16 | $13.16 | $15.75 | $21.15 | $23.74 | $30.32 | $45.36 | $69.80 | $130.19 | $199.99 | $385.17 | $624.63 | $1,175.00 |
| $240,000 | $13.44 | $13.44 | $16.08 | $21.60 | $24.24 | $30.96 | $46.32 | $71.28 | $132.96 | $204.24 | $393.36 | $637.92 | $1,200.00 |
| $245,000 | $13.72 | $13.72 | $16.42 | $22.05 | $24.75 | $31.61 | $47.29 | $72.77 | $135.73 | $208.50 | $401.56 | $651.21 | $1,225.00 |
| $250,000 | $14.00 | $14.00 | $16.75 | $22.50 | $25.25 | $32.25 | $48.25 | $74.25 | $138.50 | $212.75 | $409.75 | $664.50 | $1,250.00 |

FIG. 4F

| Cigna MVP Medical | Monthly | Biweekly | Weekly |
|---|---|---|---|
| Employee-Only | $225.34 | $104.00 | $52.00 |
| Employee + Child(ren) | $489.67 | $226.00 | $113.00 |
| Family | $962.00 | $444.00 | $222.00 |

| SisCO MEC Plus Medical | Monthly | Biweekly | Weekly |
|---|---|---|---|
| Employee-Only | $199.34 | $92.00 | $46.00 |
| Employee + Child(ren) | $442.00 | $204.00 | $102.00 |
| Family | $866.67 | $400.00 | $200.00 |

| UHC Dental PPO | Monthly | Biweekly | Weekly |
|---|---|---|---|
| Employee-Only | $29.13 | $13.44 | $6.72 |
| EE & Spouse | $58.34 | $26.93 | $13.46 |
| Employee + Child(ren) | $65.88 | $30.41 | $15.20 |
| Family | $99.51 | $45.93 | $22.96 |

| National Pacific Dental HMO* *Texas Employees only* | Monthly | Biweekly | Weekly |
|---|---|---|---|
| Employee-Only | $10.94 | $5.05 | $2.52 |
| EE & Spouse | $19.55 | $9.02 | $4.51 |
| Employee + Child(ren) | $22.11 | $10.20 | $5.10 |
| Family | $31.66 | $14.61 | $7.31 |

| UHC Vision PPO | Monthly | Biweekly | Weekly |
|---|---|---|---|
| Employee-Only | $5.26 | $2.43 | $1.21 |
| EE & Spouse | $9.97 | $4.60 | $2.30 |
| Employee + Child(ren) | $11.69 | $5.40 | $2.70 |
| Family | $16.45 | $7.59 | $3.80 |

| In-Network Benefits | PPO Complete |
|---|---|
| Calendar Year Annual Dental Deductible | $50 individual $150 family |
| Dental Maximum Benefit per Year (per member) | $1,000 |
| Orthodontia Lifetime Max (per dependent) | $1,000 |
| Covered Services | Member Cost Share |
| Preventive & Diagnostic (no deductible)<br>- Routine Oral Examinations (2 per year)<br>- Routine Cleaning (2 per year)<br>- Fluoride Treatment<br>- Sealants<br>- Bitewing X-rays | No member cost |
| Basic Services (deductible applies)<br>- Composite Fillings<br>- Space Maintainers<br>- Emergency Care for Pain Relief<br>- Amalgam Fillings<br>- Oral Surgery<br>- Oral Cancer Screening | Deductible then 20% |
| Major Services (deductible applies)<br>- Inlays/Onlays<br>- Endodontics<br>- Periodontics<br>- Bridges<br>- Crowns<br>- Implants<br>- Denture Relines/Rebases<br>- Denture Repair & Adjustments | Deductible then 50% |
| Orthodontic Services (no deductible)<br>-Braces | 50% |
| Orthodontic Age Limit | Through Age 18 |
| Dental Payroll Deductions - 24 Pay Periods | |
| Employee | $0.00 |
| Employee + Spouse | $13.28 |
| Employee + Child(ren) | $9.92 |
| Family | $23.57 |

The benefits outlined here are for illustrative purposes only. The carrier's

```
{
  "document_id": "50",
  "plans": [
    {
      "entity_key": "Child VOL Life",
      "data": [
    },
    {
      "entity_key": "Dental - Dental-001",
      "data": [
      "entity_domain": "Dental"
    },
    {
      "entity_key": "Medical - Co-Pay(PPO) Plan",
      "data": [
        {
          "element_name": "RATE",
          "element_value": "$49.09",
          "element_confidence": "HIGH",
          "source_info": {
            "page_number": 5,
            "coordinates": [
              365.16,
              560.3,
              393.72,
              572.3
            ]
          },
          "rate_type": "true",
          "table_type": "cov",
          "rate": 49.09,
          "rate_duration": "Bi-Weekly",
          "renewal_rate": "NO",
          "employee_employer": "Employee",
          "coverage_level": "EE Only"
        },
        {
          "element_name": "RATE",
          "element_value": "$124.82",
          "element_confidence": "HIGH",
```

FIG. 4K

SYSTEMS AND PROCESSES OF EXTRACTING UNSTRUCTURED DATA FROM COMPLEX DOCUMENTS

TECHNICAL FIELD

The present disclosure relates generally to data extraction of complex documents and, more particularly, to systems, processes and computer program products configured to automatically extract unstructured data from complex documents and perform table understanding on the extracted data.

BACKGROUND

Full table understanding is a very complex process without any known single available solution. This is due to the fact that source data within a table is provided in a highly unstructured form, i.e., in a wide variety of formats and layouts. This provides many challenges for table structure recognition including: (i) associating row values to headers, regardless how the table is displayed, (ii) defining what values belong to the same cell, and (iii) defining if a particular cell is part of a header or a body value. Table understanding is also of a concern in such unstructured situations.

A common pitfall is that known techniques are used for very small targets, e.g., a particular table of known format. In these solutions, the technique may work well for the small target, but it does not work well for a target that falls outside of such known format. Also, known techniques typically overfit to certain documents and, hence, do not perform well across a broad spectrum of targeted documents. In this way, some techniques that perform table understanding are too generic and do not provide any meaningful value. In addition, some solutions can only perform certain table extraction techniques; however, these techniques cannot perform table understanding, for example, in that it is not possible to map tabular relationships and place them in a structured format. Moreover, the known techniques are labor intensive, time consuming and error prone.

SUMMARY

In a first aspect of the present disclosure, a method includes: detecting, by the computer system, one or more tables within a digitized document; classifying, by the computer system, the one or more detected tables into at least a first table type; identifying, by the computer system, header cells and body cells within the first table type; extracting, by the computer system, data within the header cells s and body cells of the first table type; and mapping, by the computer system, a relationship between the extracted data within the header cells s and the body cells.

In another aspect of the present disclosure, there is a computer program product. The computer program product includes one or more computer readable storage media having program instructions collectively stored on the one or more computer readable storage media. The program instructions are executable to: provide an unstructured document in a digitized format; detect one or more tables within the digitized format of the document; classify the one or more tables into a first table type and a non-first table type; detect one or more headers within the first table type; extract cell values from the first table type; and map pertinent information in the one or more headers with values of the body cells.

In a further aspect of the present disclosure, there is a computer system. The system includes a processor, a computer readable memory, one or more computer readable storage media, and program instructions collectively stored on the one or more computer readable storage media. The program instructions are executable to: identify tables comprising different formatting and different content within pages of a unstructured, digitized document; classify the identified tables into different table types; detect data to be in header cells of only a first table type of the different table types by discriminating data within body cells and header cells using machine learning techniques; extract the data from within the body cells and header cells of the first table type; map the extracted data of the body cells and header cells to provide a relationship between the data from within the body cells and header cells; and provide the relationship into a structured format.

In embodiments, the next step after having a tabular relationship defined is to make meaning of it via table understanding techniques. For example, it is possible to classify or triage both row and/or column headers, and based on their semantics, extract target data hierarchically beneath them, as one example.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

FIG. 4B shows respective pages (1)-(6) that contain different types of tables, e.g., rates tables and non-rates tables, within the digitized document as shown and hereinafter referred to generally as FIG. 4B.

FIGS. 4C-4I show respective representations of different single rates tables in different formats and layouts. (As discussed below, table 4I is to be considered a single table which comprises a combination of elements.)

FIG. 4J shows a representation of a fully extracted table that includes rates information. amongst other information in accordance with aspects of the present disclosure.

FIG. 4K shows a representation of an output in JSON format in accordance with aspects of the present disclosure.

FIG. 4L shows a representation of an output of a structured table in accordance with aspects of the present disclosure.

DETAILED DESCRIPTION OF ASPECTS OF THE INVENTION

Figure 1:
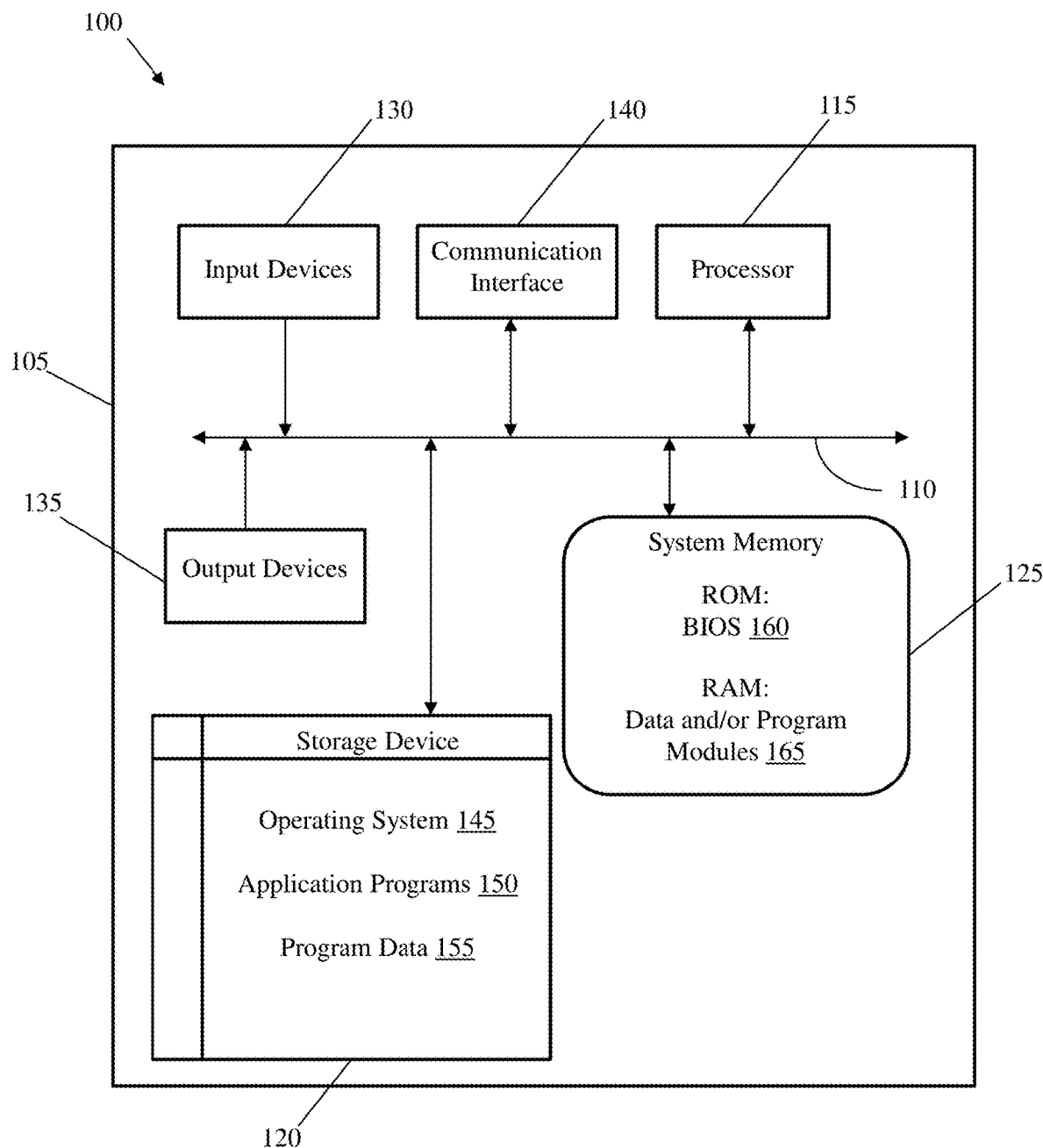
FIG. 1 is an illustrative architecture of a computing system implementing embodiments of the present disclosure.

The present disclosure relates generally to data extraction of complex documents and, more particularly, to systems, processes and computer program products configured to automatically extract unstructured data from complex documents and perform table understanding on such extracted data. More specifically, the present disclosure relates to systems, processes and computer program products capable of extracting unstructured data from tables of varying formats, layouts and with different types of content, and taking this extracted data and placing it in a structured format for further analysis. For example, in embodiments, the systems, processes and computer program products extract unstructured text from differently formatted tables and map the relationships of the extracted text from within the table. Accordingly and advantageously, the present disclosure provides an efficient way to extract data across a broad spectrum of targeted documents with a high recall rate, and being capable of mapping relationships between the extracted data for further analysis and automated input into other systems.

In the context of this disclosure, the term "unstructured" refers to documents with no anticipated format in which the data or information is presented, in any order and in any formal language. For example, tables may be unstructured in that they vary in format, content and/or size, i.e., lack of consistent patterns with a high variability in the appearance of relevant data. And the lack of any structure makes automated table extraction or text extraction from these complex documents a very difficult task. Although this disclosure focuses on tables in the English language, it should be understood by those of skill in the art that the systems, processes and computer program products described herein may be used to extract data from any complex document presented in any language. For example, the information extracted can be presented in paragraph form or other discrete, unstructured format, in any formal language.

Rates extraction is an essential task required for plan setup activity for users (third party companies such as ADP Inc.) that keep track of benefits documents, e.g., Medical, Dental, Vision, Life and Disability plans, for other companies. But clients and benefit providers commonly deliver rates tables that do not follow any specific pattern, such that a simple "search and extract" engine would not work for the scenario of rates extraction. For example, rates tables could be combined in a table containing other textual information (other than rates), in age-banded tables (where different rows represent different age bands) and in multi-header tables (where several levels of headers are present), amongst other formats.

In the context of the present disclosure, information extraction from benefits documents presents a challenge to accurately extract rates information due to the fact that rates tables appear in different formats and could contain hundreds of numeric values, making it an error-prone and laborious task for a human to read, interpret, and transcribe into a centralized system. Accordingly, the source data is highly unstructured, i.e., provided in a wide variety for formats and layouts, making it very difficult to extract the necessary data accurately and efficiently. Consequently, there are multiple challenges to automate rates extraction which are solved by the present disclosure such as: (i) associating row values to headers, regardless how the table is displayed; (ii) defining what values belong to the same cell; (iii) defining if a particular cell is part of a header or a body value; and (iv) interpreting the now organized data in order to generate information via its understanding.

The systems, processes and computer program products described herein provide a technical solution to this problem by automatically addressing the rates extraction task from benefits documents or other complex documents by applying a sequence of unique processing steps. These processing steps make use of machine learning models, as well as heuristics that combine the results of these models to fully extract information from tables, e.g., rates tables, and convert them into a structured format for further analysis, i.e., mapping relationships for table understanding. Generally, this technical solution can be accomplished through the use of, amongst other features as described herein, document digitization, table classification, header identification, and text extraction. The output, e.g., extracted data, can be provided as a data model in a structured format, including coordinates of extracted data from the source document. This output provides the user with interactive insights, as well as evidenced of extraction.

For example, in embodiments, the data extraction described herein may filter out irrelevant information by means of classification. The relevant extracted data can then be mapped for relationships, i.e., map text between body cells and a header using, for example, spatial relationships, minimizing distances, alignment of values within body cells and header cells, etc., for table understanding, while taking advantage of semantics to produce a complete table data model. Illustratively, the systems, processes and computer program products can define data within body cells and headers, with row values being associated with respective headers regardless how the table is displayed to the user. Moreover, the systems, processes and computer program products are lightweight as it simplifies table understanding by only processing relevant parts of the table. Also, the systems and methods define what values belong to the same cell, e.g., defining if a particular cell is part of header or a body value.

Computing Infrastructure

FIG. 1 is an illustrative architecture of a computing system 100 implemented in embodiments of the present disclosure. The computing system 100 is only one example of a suitable computing system and is not intended to suggest any limitation as to the scope of use or functionality of the disclosure. Also, computing system 100 should not be interpreted as having any dependency or requirement relating to any one or combination of components illustrated in computing system 100. Moreover, computing system 100 is structured and configured to implement the systems, processes and computer program products described herein. The computer program product may include a tangible computer readable storage medium (or media) having computer readable program instructions thereon for causing a processor to carry out aspects of the present disclosure. The tangible computer readable storage medium (or media) is non-transitory.

Figure 2:
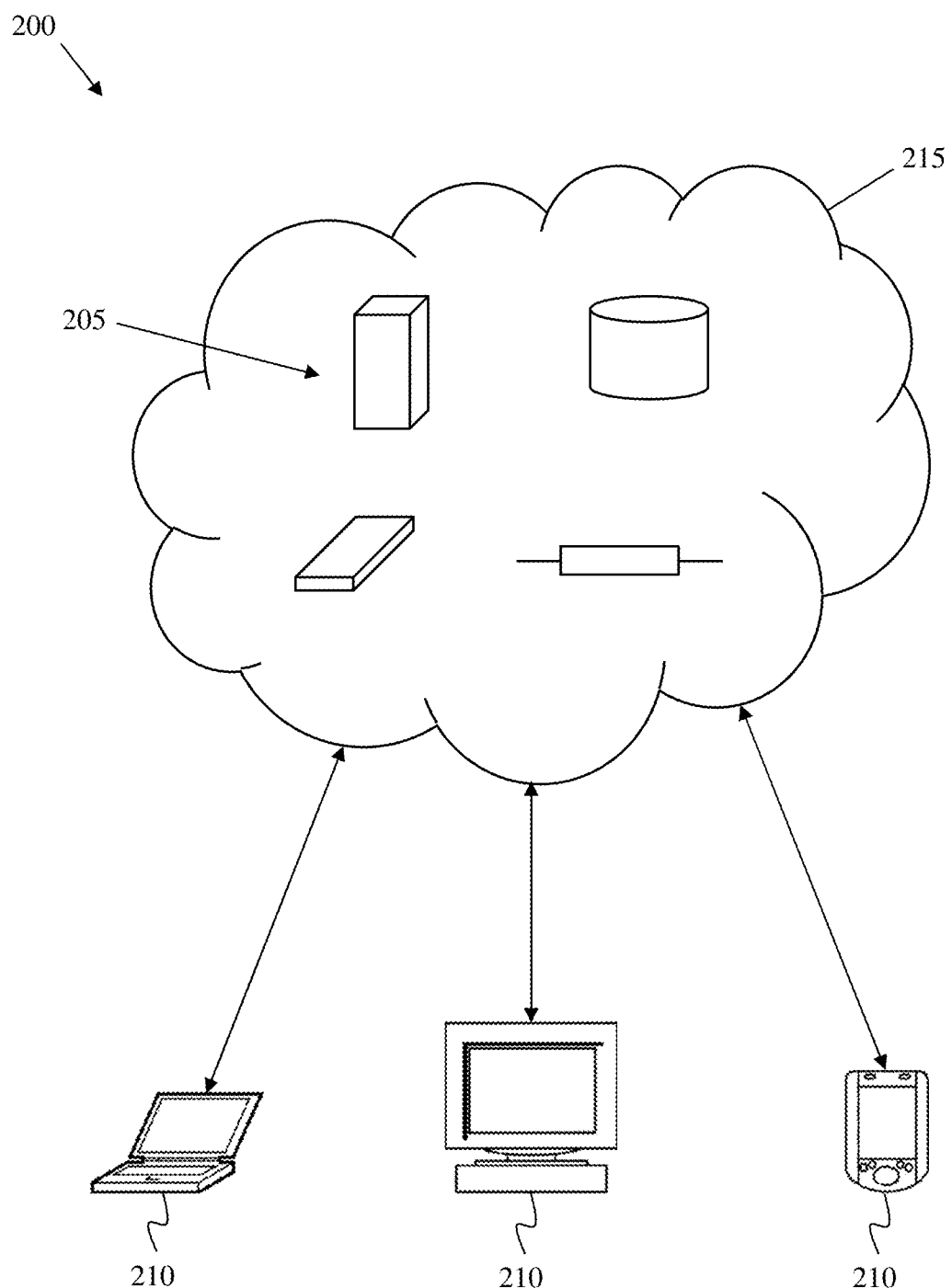
FIG. 2 shows an exemplary cloud computing environment in accordance with aspects of the present disclosure.

As shown in FIG. 1, computing system 100 includes a computing device 105. The computing device 105 can be resident on a network infrastructure such as within a cloud environment as shown in FIG. 2 or may be a separate independent computing device (e.g., a computing device of a third-party service provider). The computing device 105 may include a bus 110, a processor 115, a storage device 120, a system memory (hardware device) 125, one or more input devices 130, one or more output devices 135, and a communication interface 140.

The bus 110 permits communication amongst the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more processors or microprocessors that include any processing circuitry operative to interpret and execute computer readable program instructions, such as program instructions for controlling the operation and performance of one or more of the various other components of computing device 105. In embodiments, processor 115 interprets and executes the processes, steps, functions, and/or operations of the present disclosure, which may be operatively implemented by the computer readable program instructions.

For example, processor 115 can be used to digitize a complex document including tables within the complex document. As should be understood, the complex document may include one or more tables and accompanying text or images outside of the one or more tables. Once the complex document is digitized, processor 115 can detect the tables within the complex document by utilizing different techniques such as using bounding box coordinates for each table found in each page of the digitized document.

The processor 115 then classifies the tables into different table types, e.g., rates tables vs. non-rates tables, and extracts data from the rates tables using machine learning to detect header information within the tables. For example, processor 115 can input text and corresponding layout information to a model that is used to group table text into cells and to distinguish the cells between header cells and body cells. The processor 115 can then be used to extract data from these cells by use of a combination of strategies such as, for example, machine learning and/or heuristics, and/or pattern matching, etc., to identify relevant table elements and their respective relationships, e.g., relationships between headers and cell values. The output can then be provided in a structured manner, i.e., extracted rates data model in a structured format, including coordinates and relationships of extracted data from the source document.

In embodiments, processor 115 may receive input signals from one or more input devices 130 and/or drive output signals through one or more output devices 135. The input devices 130 may be, for example, an optical character recognition (OCR) system for retrieving elements from the document, as is known to those of skill in the art such that no further description is required for a complete understanding of the present disclosure. The output devices 135 can be, for example, any display device, printer, etc., as is known to those of skill in the art such that no further description is required for a complete understanding of the present disclosure.

The storage device 120 may include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 105 in accordance with the different aspects of the present disclosure. In embodiments, storage device 120 may store operating system 145, application programs 150, and program data 155 in accordance with aspects of the present disclosure.

The system memory 125 may include one or more storage mediums, including for example, non-transitory media such as flash memory, permanent memory such as read-only memory ("ROM"), semi-permanent memory such as random-access memory ("RAM"), any other suitable type of storage component, or any combination thereof. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

The communication interface 140 may include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

As discussed herein, computing system 100 may be configured to digitize documents, classify tables found within the digitized documents, detect and extract information within the tables and map the relationships between the extracted information, e.g., headers to respective cell values. The extraction may be performed by machine learning, heuristics, pattern matching, etc., and the mapping may be performed by, for example, detecting a minimal distance between body cells and elements in the header cells, alignment constraints between body cells and elements in the detected header cells, etc. Accordingly, computing device 105 may perform tasks (e.g., process, steps, methods and/or functionality) in response to processor 115 executing program instructions contained in a computer readable medium, such as system memory 125 to perform the functions data extraction in accordance with aspects of the present disclosure.

The program instructions may be read into system memory 125 from another computer readable medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the end results of such tasks in accordance with aspects of the present disclosure. In additional or alternative embodiments, hardwired circuitry may be used in place of or in combination with the program instructions to implement the tasks, e.g., steps, methods and/or functionality, consistent with the different aspects of the present disclosure. Thus, the steps, methods and/or functionality disclosed herein can be implemented in any combination of hardware circuitry and software.

FIG. 2 shows an exemplary cloud computing environment 200 in accordance with aspects of the disclosure. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein may be performed and/or provided via cloud computing environment 200.

As depicted in FIG. 2, cloud computing environment 200 includes cloud resources 205 that are made available to client devices 210 via a network 215, such as the Internet. Cloud resources 205 can include a variety of hardware and/or software computing resources, such as servers, databases, storage, networks, applications, and platforms. Cloud resources 205 may be on a single network or a distributed network. Cloud resources 205 may be distributed across multiple cloud computing systems and/or individual network enabled computing devices. Client devices 210 may comprise any suitable type of network-enabled computing device, such as servers, desktop computers, laptop computers, handheld computers (e.g., smartphones, tablet computers), set top boxes, and network-enabled hard drives. Cloud resources 205 are typically provided and maintained by a service provider so that a client does not need to maintain resources on a local client device 210. In embodiments, cloud resources 205 may include one or more computing system 100 of FIG. 1 that is specifically adapted to perform one or more of the functions and/or processes described herein.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210. Cloud resources 205 may be configured, in some cases, to provide different service models to different client devices 210. For example, cloud resources 205 can provide SaaS to a first client device 210 and PaaS to a second client device 210.

In embodiments, software and/or hardware that performs one or more of the aspects, functions and/or processes described herein may be accessed and/or utilized by a client (e.g., an enterprise or an end user) as one or more of a SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

Cloud resources 205 may be configured to provide a variety of functionality that involves user interaction. Accordingly, a user interface (UI) can be provided for communicating with cloud resources 205 and/or performing tasks associated with cloud resources 205. The UI can be accessed via a client device 210 in communication with cloud resources 205. The UI can be configured to operates in a variety of client modes, including a fat client mode, a thin client mode, or a hybrid client mode, depending on the storage and processing capabilities of cloud resources 205 and/or client device 210. Therefore, a UI can be implemented as a standalone application operating at the client device in some embodiments. In other embodiments, a web browser-based portal can be used to provide the UI. Any other configuration to access cloud resources 205 can also be used in various implementations.

Exemplary Functional Block Diagram

Figure 3:
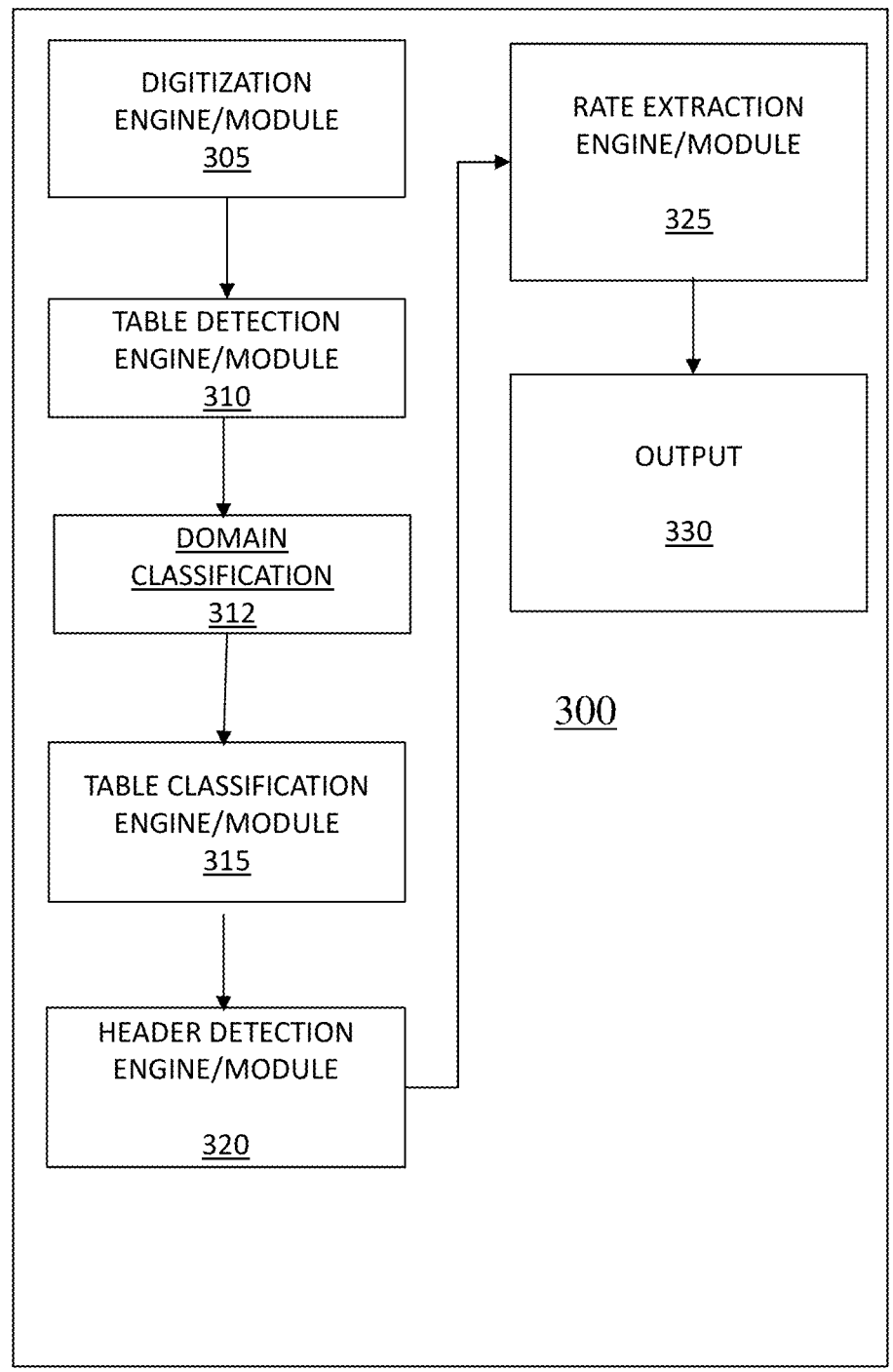
FIG. 3 shows a block diagram in accordance with aspects of the present disclosure.

FIG. 3 shows a block diagram in accordance with aspects of the present disclosure. More specifically, FIG. 3 shows a functional block diagram 300 that illustrates functionality of aspects of the present disclosure. In embodiments, functional block diagram 300 may be representative of a system comprising a digitization engine/module 305, table detection engine/module 310, domain classification engine/module 312, table classification engine/module 315, header detection engine/module 320, rates extraction engine/module 325 and an output 330, each of which may comprise one or more program modules such as program modules 165 described with respect to FIG. 1. The system may include additional or fewer modules than those shown in FIG. 3. For example, separates modules may be integrated into a single module or a single module may be implemented as multiple modules. Moreover, in practice, the environment may include additional devices and/or networks; fewer devices and/or networks; different devices and/or networks; or differently arranged devices and/or networks than illustrated in FIGS. 1-3.

Figure 4A:
FIG. 4A shows a representative digitization of a complex document in accordance with aspects of the present disclosure.

In embodiments, digitization engine/module 305 receives a complex document such as, for example, a Benefit Enrollment Guide from a client as shown representatively in FIG. 4A. The digitization engine/module 305 can digitize the Benefit Enrollment Guide and display this digitization representation. For example, the digitization engine/module 305 splits the pages of the document into page numbers or other formats that are digestible for downstream processes used with, e.g., the modules 310, 312, 315, 325. In embodiments, the digitization engine/module 305 calls an API with an extraction response.

Figures 4B, 4C, 4D:
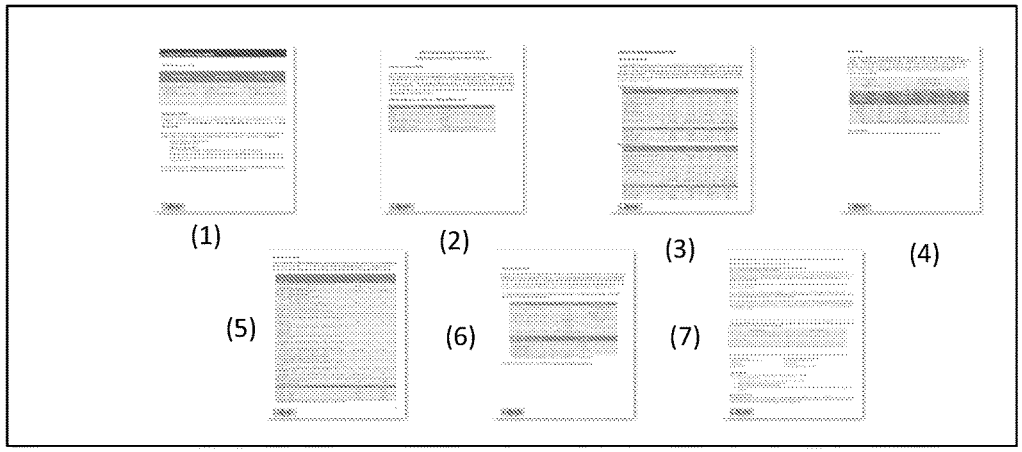
Figure 4H:
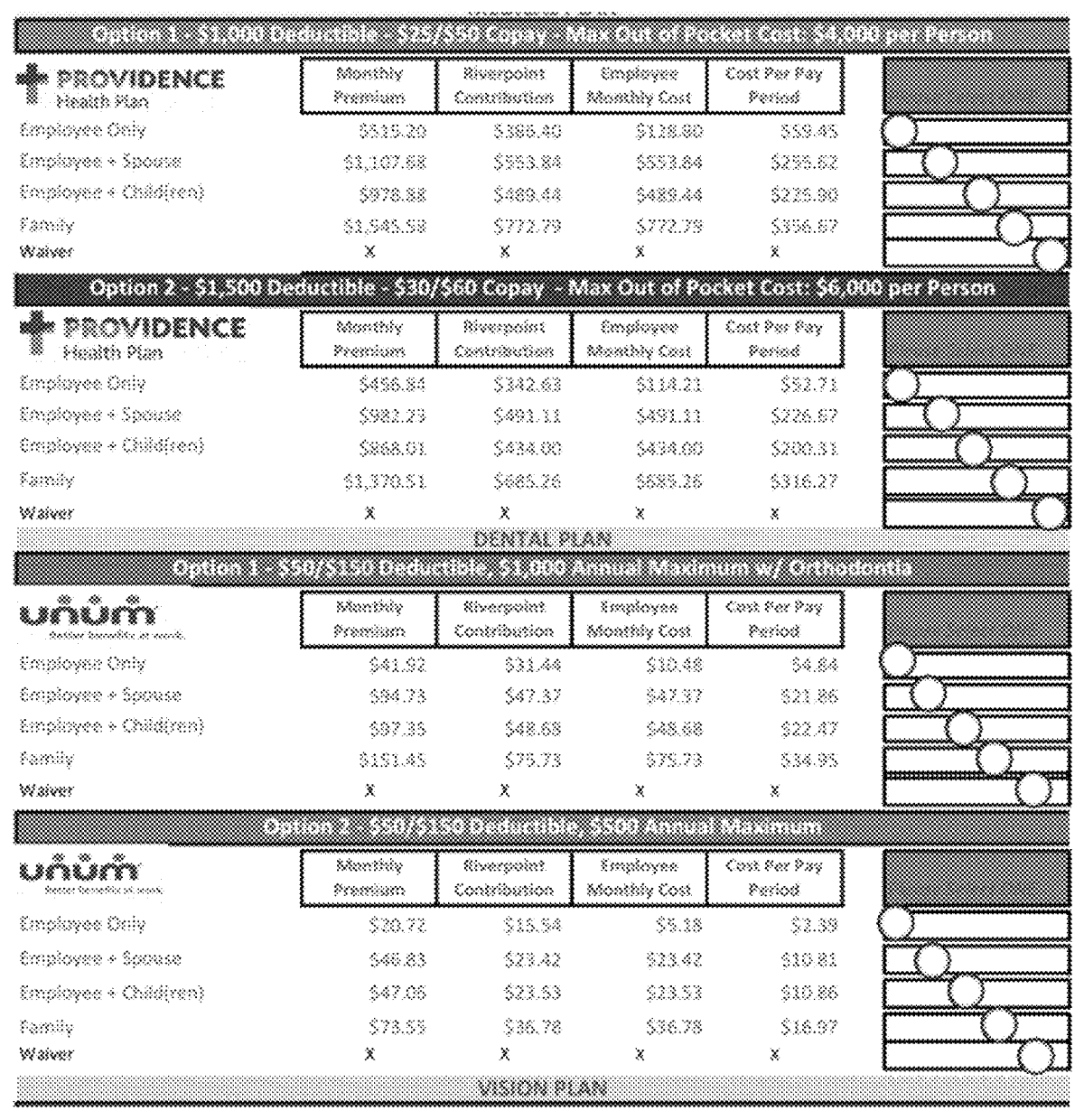

The table detection engine/module 310 may identify respective pages within the digitized document that contains tables as shown representatively in FIG. 4B. As should be understood by those of skill in the art, for the example of extracting rates information from a rates table, the majority of target data is found in tables, hence the need to identify those tables within the document itself. In embodiments, the table detection engine/module 310 may use a deep learning model to detect tables in document pages using a bounding box technique. For example, a set of <x1, y1, x2, y2> bounding box coordinates may be provided for each table found in a given page. These tables can be bordered tables 400 as shown in FIG. 4C and/or borderless tables 405 as shown in FIG. 4D; although other types of tables with varying formats as shown in FIGS. 4C-4I, amongst other table formats, may be identified by table detection engine/module 310.

In embodiments, domain classification engine/module 312 may work in parallel with or separate from the table detection engine/module 310. By way of illustration, domain classification engine/module 312 may look at text in the table and/or outside of the table to classify the domain on that page. The page domain, in turn, may assist in the identification of pertinent elements not found in the table itself, by placing the table in context of the contents of the page. For example, domain classification engine/module 312 classifies the domain for the page (compared to rate extraction that uses the classification of the page to help with identifying important elements related to rate information).

The table classification engine/module 315 classifies each table found within the identified pages. For example, the table classification engine/module 315 may use a machine learning model to classify table types, e.g., rates table and non-rates tables, for downstream processing. Illustratively, an extracted rates table 410 is shown in FIG. 4E. In embodiments, different rates tables in different formats can also be identified as shown, for example, in FIGS. 4C, 4D and 4F-4I.

The header detection engine/module 320 may be used to identify header elements. The identification of header information may be performed through a deep learning multimodal (text and layout) model using machine learning as described in detail herein. As an example, header detection engine/module 320 may identify what elements are to be associated with a header and what elements are not to be associated with a header. The header detection engine/module 320 can also group text into one or multiple cells and classify whether the text should be a header cell or body cell using, for example, machine learning techniques as described herein.

In further embodiments, header detection engine/module 320 can use techniques to identify the cells to be used as a header, which are later subjected to downstream processes such as spatial analysis for associating body cells to respective header cells for mapping purposes. See, e.g., reference numerals 437 and 440 of FIG. 4J for header detection (and then extraction). In embodiments, the header detection task may be performed by a machine learning model. The input to the model includes texts (within the table), bounding boxes of each text, and the model output is the texts grouped into cells (with bounding boxes of each cell) with indicator whether the cell is a header or body cell. After header detection is performed, cells bounding boxes may be used for the subsequent processing (using spatial, minimizing distances, etc.).

Figures 4J, 4L:
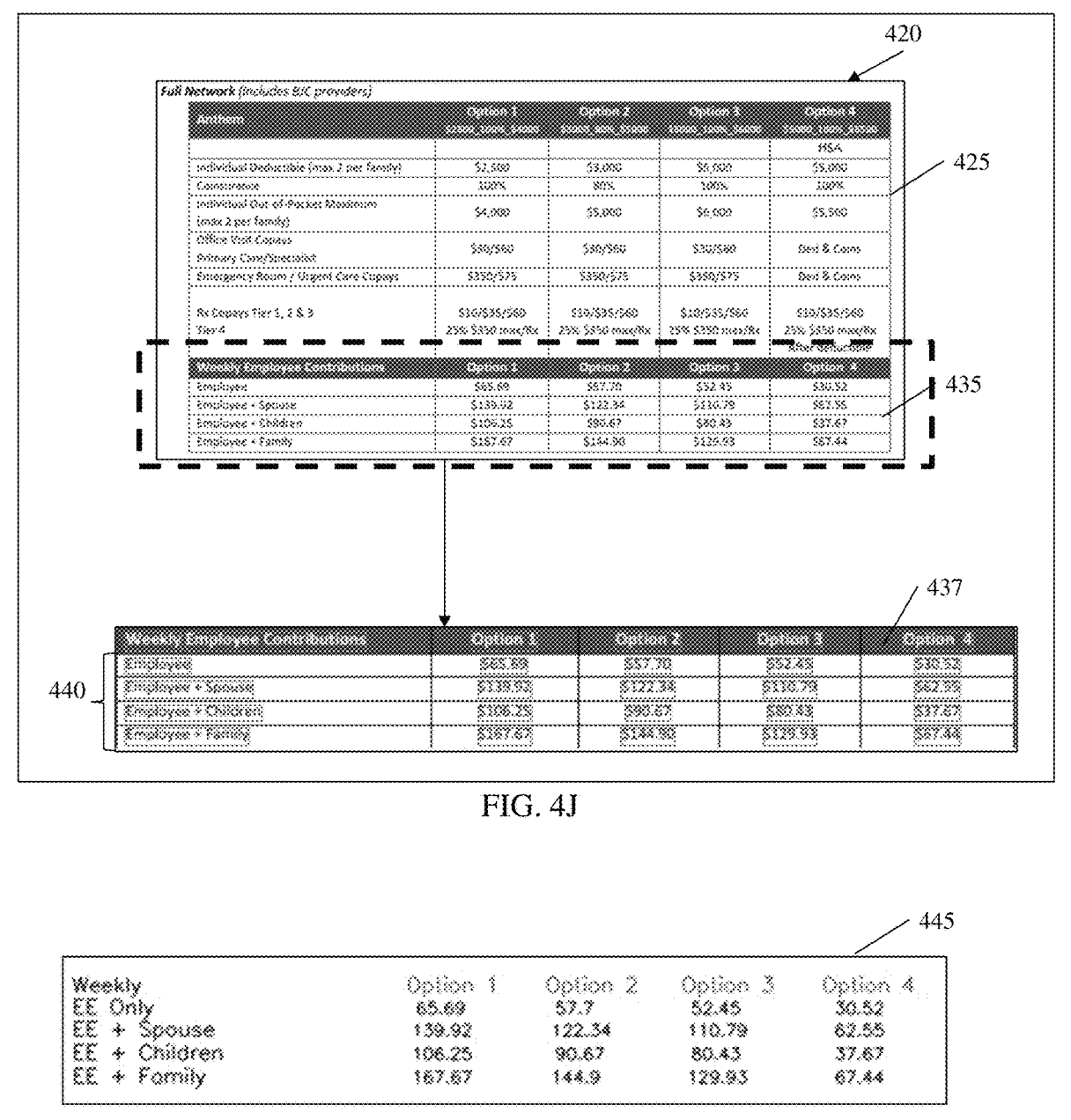

In this implementation, for example, a model may be trained on datasets of rates tables to be able to specialize in tables present on this domain. It should be understood by those of skill in the art, though, that the model can be trained on other datasets depending on the required information to be extracted from a table, e.g., non-rates table information. In any scenario, text and corresponding layout information are input to the model that is used to group table text into cells and to distinguish the cells between header cells and body cells. This is shown representatively in FIG. 4J. This process can also distinguish between tables within multi-header tables (where several levels of headers are present) as shown in FIG. 4J, or combination tables as shown in tables 4G or FIG. 4I, or in age-banded tables (where different rows represent an age band) as shown in FIG. 4F. FIG. 4I is a single table presented as a combination table comprising rates information in addition to other information, e.g., non-rates information, which can be stripped out in downstream processes. Accordingly, this process can be performed for any number of different table types and table layouts such as those shown in FIGS. 4C, 4D and 4F-4I.

As representatively shown in FIG. 4J, the table 420 can be subjected to extraction processes, e.g., extracted rates information 435 and additional information 4250. This additional information may be, for example, different plan types and related dollar amounts that need not be analyzed and mapped for purposes of this disclosure. In embodiments, the additional information 425 as well as text outside of the table 420 may be analyzed using machine learning, pattern matching, heuristics, etc., if certain elements are not found within the table. For example, header elements (e.g., text that should be in the header such as "dental plan", etc.) could be outside of the table in which case that text can be analyzed, determined that it belongs to a header cell and, during mapping, then be mapped to a particular body cell. Another instance is to use the text outside of the table to determine the domain of that page, which may then be used to offer a level of semantics of what is in the table, regardless of whether relevant information is found inside the table. An illustrative non-limiting example, a search of text outside of the table can be used to determine a plan type (which is not in table), which can then be used to assign the plan type to the rates information.

The different portions 425, 435 may be detected by bounding box techniques, for example, using the header detection engine/module 320 and then the information within the cells can be extracted using pattern matching, machine learning, heuristics, etc. For example, highlighted portions 437 and boxes 440 representatively show detection of header cells. For example, header detection engine/module 320 may identify header information 440, e.g., employee, employee+spouse, employee+children, employee+family. The header detection engine/module 320 may also detect the different options and the header entitled "Weekly Employee Contributions". Also, in embodiments, header detection engine/module 320 may be used to group information into a single cell based on proximity, domain information of other techniques described herein.

The rate extraction engine/module 325 may perform rate extraction and other text extraction in both the header cells and respective body cells of the relevant portion 435 of the table (e.g., rates portion of the table). The rates extraction engine/module 325 may use machine learning, heuristics, pattern matching and/or exact matching or other known techniques or combinations thereof to identify relevant table elements. In embodiments, the rates extraction engine/module 325 may also use spatial based heuristics to determine the relationship between table elements, i.e., cell values with respective headers. In embodiments, this may be performed by identifying a nearest header with element specific heuristics.

The output 330 may be provided in JSON format as shown representatively in FIG. 4K. In embodiments, the extracted rates data may be recreated from the JSON output into a structured format, including coordinates of extracted data from source document as shown in table 445 of FIG. 4L. For example, FIG. 4L may be representative of a visualization of the extracted information from FIG. 4J. This visualization has established and normalized the extracted data of FIG. 4J. For example, the normalized data may the terminology "EE", "EE"+Spouse, etc., compared to using the terminology "employee" of FIG. 4J. The visualization of FIG. 4L is also in comparison to the information provided in the JSON format as shown in FIG. 4K (which is more difficult to easily read). As the information in table 445 is structured, it many now be automatically input into other systems, e.g., Workforce Now® (Workforce Now® is a registered trademark of ADP Inc.), to provide additional analysis and interactive insights.

Exemplary Flow Diagrams

Figure 5:
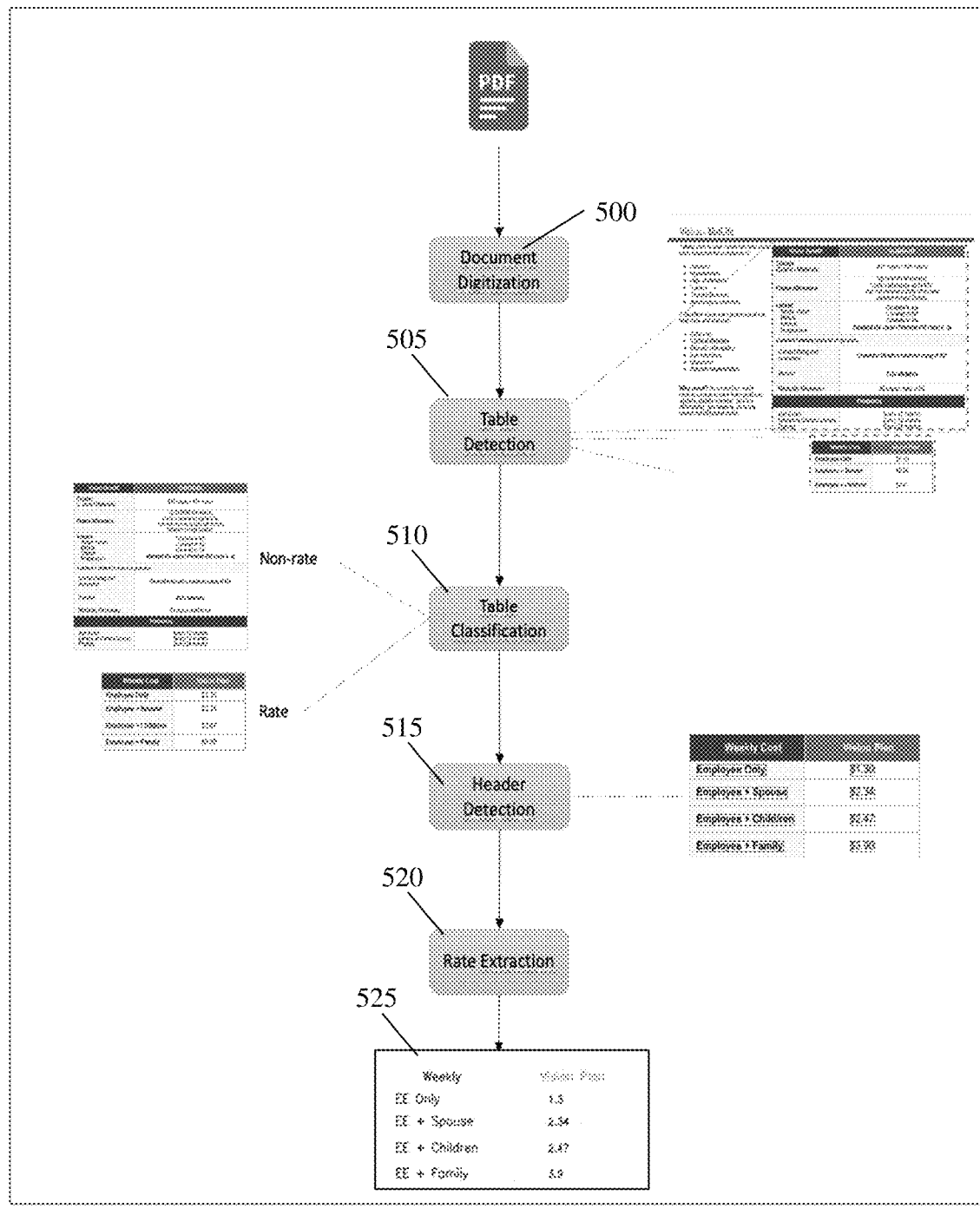
FIG. 5 depicts an exemplary flow diagram for processes in accordance with aspects of the present disclosure

FIG. 5 depicts an exemplary flow diagram implementing processes in accordance with aspects of the present disclosure. The exemplary flow can be illustrative of a system, a process, and/or a computer program product and related functionality implemented on the computing system of FIG. 1. The computer program product may include computer readable program instructions stored on computer readable storage medium (or media). The computer readable storage medium may include one or more tangible storage medium as described with regard to FIG. 1, e.g., non-transitory media, a tangible device, etc. The processes and/or computer program product implementing the flow of FIG. 5 can be downloaded to respective computing/processing devices, e.g., computing system of FIG. 1 as already described herein, or implemented on a cloud infrastructure as described with regard to FIG. 2. Accordingly, the processes associated with the flow of the present disclosure can be implemented by special purpose hardware-based systems that perform the specified functions or acts or carry out combinations of special purpose hardware and computer instructions.

FIG. 5 shows an overall process in accordance with aspects of the present disclosure. In particular, at step 500, the process will retrieve a document and digitize the document. In the context of this disclosure, digitizing refers to the conversion of any images (table(s)) and text from analog form into a digital form (bits). The digitization of the documents may be performed by known methods to those of skill in the art such that no further explanation required for a complete understanding of the present disclosure.

The document may be any document containing different employee benefit plans with rates information; although other complex documents are also contemplated herein. In embodiments, the different employee benefit plans may be, for example, health plans, dental plans, vision plans, life insurance plans, disability plans, etc. These documents may include both text and tables in different formats, layouts, and/or content. For example, the tables from different employers and/or different plan providers may include bordered or borderless tables, multiple header tables, tables within tables, tables with horizontal lines delineating different content, numerical values in different rows/columns, etc., some of them which include rates information or other information. These documents may be provided in PDF format or other formats such as, e.g., Joint Photographic Experts Group (JPEG); Portable Network Graphics (PNG); Graphics Interchange Format (GIF); Tagged Image File (TIFF); Photoshop Document (PSD); Encapsulated Postscript (EPS); or Adobe Illustrator (AI), Microsoft products (e.g., Word, Excel), etc.

At step 505, the process identifies tables within the pages of the digitized document. In embodiments, the process can identify many different types of tables within the digitized document. For example, the tables can be bordered tables, borderless tables, tables embedded within paragraphs, tables within tables, tables with multiple headers, tables with different layouts or content, etc. As disclosed already, the tables can be identified by bounding the tables with coordinates, e.g., <x1, y1, x2, y2> bounding box coordinates, for each table found in a given page of the digitized document.

At step 510, the identified tables can be classified into different table types. For example, the classification can be made by a machine learning model that is used to classify table types, e.g., rates table, non-rates tables, etc. In embodiments, the classification may be performed by grabbing the text within the table and, using this text, determine the type of table. This technique can be used with any table layout, whether it be borderless, bordered, combination tables (e.g., see table in FIG. 4E), etc. Also, in embodiments, different pipelines may be used depending on rate-type (e.g., coverage level vs. rates structure, etc.). For purposes of this disclosure, it is assumed that the rates tables are being used in further processes described herein.

At step 515, the process performs header detection on the classified rates tables (or another table type). In embodiments, the header detection may include text extraction techniques capable of extracting data from within the tables and, using this data, discriminate between cell data and header data. For example, in embodiments, text extraction techniques may include a deep learning multi-modal (text and layout) model used to detect header information, where the process can be trained on particular tables in which the headers are relevant to the current analysis. The header information may also be detected using a machine learning model to help identify pertinent header information. Illustratively, in an example of a rates table, the model may be trained on datasets of rates tables in order to specialize in tables present in this domain. In this scenario, text and corresponding layout information may be input to the model that is used to group table text into cells and to distinguish cells between header information and body cells. The headers can also be identified using bounding box techniques as described herein.

In embodiments, the header detection process may group text into cells and differentiate cells between body cells and header cells using machine learning techniques (e.g., using multi-modal deep learning model). For example, in embodiments, the detection process may combine values of multiple cells into a single header cell. This may include combining text that spans over several cells or lines into a single header, e.g., multiple cells or lines, etc. For example, the header detection can detect headers by machine learning techniques (with bounding boxes being information that is used by the machine learning model), wherein the model can group the text and the classification can determine that it can be a header cell and body cell, hence distinguishing between the cell boundaries.

At step 520, the process performs a rate extraction process. The extraction process may use machine learning and/or custom heuristics to identify relevant table elements including, for example, pattern matching, exact matching, and other techniques to extract important information from the body cells and header cells. In embodiments, for a rates table, the extraction process is a rates extraction process. Also, the extraction process may use spatial based heuristics to determine the relationship between table elements and the nearest, identified header. For example, the text extraction process may determine a relationship between table elements and the header information that are aligned with one another. In another example, mapping of relationships between body cells and header cells may include using a nearest identified element with the header cells by minimizing geometrical distance based on various constraints such as alignment, spatial distances, etc. In addition, the rate extraction process can extract information (e.g., text) from outside of the table.

Also, the text extraction process may be used to discard header data or entire portions of the table that are not relevant to a subsequent analysis, etc. As to this example, in a scenario of a several tables embedded into a single table, it is possible to discard portions of the table which are not relevant to a subsequent analysis (or table understanding) of rates tables when using text extraction analysis. So, for example, the text extraction process may be used to discard certain portions of a multi-tiered table as not being relevant to rates information. Accordingly, the text extraction process can look through all the headers and table cells in the entire table to determine what is important and what is not important to place into a structured format for future export and analysis into another standardized system, i.e., WorkForce Now®.

As further shown in FIG. 5, an output 525 is provided using the data obtained from the data extraction process. For example, once the data extraction process is completed and all of the data of the table elements has been identified and the relationships have been determined, i.e., between header cells and body cells, it is possible to provide output 525 which is in a structured format. The structured format may be provided in tabular format, which can now be entered into a standardized system for further analysis.

Accordingly, in view of the above, it should now be understood by those of ordinary skill in the art that the underlying importance of the present disclosure provides a technical solution to take an unstructured, complex document, glean information from that document by bounding certain text or tables to isolate certain features in the document, and obtain information from the text or table(s). The information from the text or table(s) will be transferred from an unstructured format into a structured format with a mapping of relationships between the data, e.g., between header cells and body cells of a table originally comprising multiple columns with multiple headers. And the present disclosure provides the capability of providing such relationship in a structured format regardless of the nature (format or content) of the original unstructured, complex document.

The foregoing examples have been provided merely for the purpose of explanation and are in no way to be construed as limiting of the present disclosure. While aspects of the present disclosure have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present disclosure in its aspects. Although aspects of the present disclosure have been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A method of document extraction comprising:
    receiving, by a computer system comprising a processor coupled with memory, a digitized document comprising rate information for benefits in a first table associated with a first layout and first content, and a second table associated with a second layout and second content, wherein the first layout and the second layout are unstructured;
    training, by the computer system, using training datasets comprising a plurality unstructured tables as inputs, one or more deep learning multi-modal models to detect tables with unstructured layouts in digitized documents, and to classify the detected unstructured tables as rates tables or non-rates tables based on a content of the detected unstructured tables;
    detecting, by the computer system using the trained one or more deep learning multi-modal models, the first table and the second table within the digitized document and determining bounded boxes with coordinates for each of the first table and the second table based on identifying the first layout and the second layout that are unstructured layouts;
    classifying, by the computer system, responsive to the detection, the first table as a rates table and the second table as a non-rates table by using the one or more deep learning multi-modal models based on the first content and the second content within the bounded boxes;
    including, by the computer system, responsive to classifying the first table as the rates table, the first table for layout analysis, and excluding, by the computer system, responsive to classifying the second table as the non-rates table, the second table for the layout analysis, wherein the layout analysis comprises identification of header cells and body cells of the rates table using the one or more deep learning multi-modal models based on the first content and the first layout within the bounded boxes, wherein the identification of header cells comprises identifying text in different table cells and grouping the text from the different table cells together into at least one header cell in a combined table as a third layout;
    extracting, by the computer system, rate values from the first content based on the header cells and the body cells of the rates table;
    mapping, by the computer system, the extracted rate values to the third layout using spatial heuristics based on the first layout and the first content within the bounded boxes using a nearest identified element with the header cells by minimizing geometrical distance between the extracted rate values and header cells of the third layout according to at least one of a proximity constraint or an alignment constraint;
    configuring, by the computer system, a graphical user interface with the extracted rate values mapped to the third layout using the spatial heuristics and according to the at least one of the proximity constraint or the alignment constraint; and
    providing, by the computer system for presentation on a display device, the graphical user interface of the third layout in a structured format including coordinates of extracted data from the digitized document.

2. The method of claim 1, wherein the digitized document comprises unstructured text.

3. The method of claim 1, wherein the identifying of the header cells includes:
    identifying, by the computer system, text to include in the header cells from a fourth content of the digitized document not corresponding to the first table or the second table.

4. The method of claim 1, wherein the digitized document comprises text outside the first table and the second table, and the method further comprises:
    classifying, by the computer system, the text outside the first table and the second table to identify a domain of the digitized document; and
    determining, by the computer system, that the first table corresponds to the rates table type based at least in part on the domain.

5. The method of claim 4, wherein the classifying is performed by a data extracting process, and the method further comprises:
    determining, by the computer system, a plan type based on the text outside the first table and the second table; and
    outputting, by the computer system, an indication of the plan type in association with the extracted rate values on the graphical user interface.

6. The method of claim 5, wherein the classifying comprises inputting data from rates tables into the one or more deep learning multi-modal models with a known data set.

7. The method of claim 4, wherein the classifying of the first detected table and the second detected table further comprises discarding the non-rates table type.

8. The method of claim 1, further comprising placing data within the header cells and the body cells of the rates table type in the structured format.

9. The method of claim 1, wherein the extracting comprises at least one of heuristics and machine learning techniques to identify relevant elements in the header cells and respective relationships with values of the body cells.

10. The method of claim 1, comprising:
classifying, by the computer system, a domain of the digitized document as related to benefits using text outside the first table and the second table in the digitized document.

11. A computer program product comprising one or more non-transitory computer readable storage media having program instructions collectively stored on the one or more computer readable storage media for document extraction, the program instructions, by a processor, executable to:
receive an unstructured document in a digitized first format comprising a first table associated with a first layout and first content and second table associated with a second layout and second content, wherein the first layout and the second layout are unstructured;
train, using training datasets comprising a plurality unstructured tables as inputs, one or more deep learning multi-modal models to detect tables with unstructured layouts in digitized documents, and to classify the detected unstructured tables as rates tables or non-rates tables based on a content of the detected unstructured tables;
detect, using the trained one or more deep learning multi-modal models, the first table and the second table within the digitized first format of the unstructured document and determining bounded boxes with coordinates for each of the first table and the second table based on identifying the first layout and the second layout that are unstructured layouts;
classify, responsive to the detection, the first table as a rates table type and the second table as a non-rates table type by using the one or more deep learning multi-modal models based on the first content and the second content within the bounded boxes;
detect, responsive to classifying the first table as the rates table and the second table as the non-rates table, the first table for layout analysis, and exclude, responsive to classifying the second table as the non-rates table, the second table for the layout analysis, wherein the layout analysis comprises identification of one or more headers of the rates table using the one or more deep learning multi-modal models based on at least one of the first content and the first layout within the bounded boxes, wherein the identification of header cells comprises identifying text in different table cells and grouping the text from the different table cells together into at least one header cell in a combined table as a third layout;
extract rate values from the first content based on the one or more headers of the rates table type;
map the extracted rate values and the one or more headers into the third layout using spatial heuristics based on at least one of the first layout, the second layout, the first content and the second content within the bounded boxes, using a nearest identified element with the header cells by minimizing geometrical distance between the extracted rate values and header cells of the third layout according to at least one of a proximity constraint or an alignment constraint;
configure a graphical user interface with the extracted rate values mapped to the third layout using the spatial heuristics and according to the at least one of the proximity constraint or the alignment constraint; and
provide, for presentation on a display device, the graphical user interface of the third layout in a structured format including coordinates of extracted data from the digitized document.

12. The computer program product of claim 11, wherein the classifying the first table and the second table is provided for pages of the unstructured document.

13. The computer program product of claim 11, wherein the one or more headers is detected by text extraction.

14. The computer program product of claim 11, wherein the one or more headers is detected using a bounding box technique.

15. The computer program product of claim 11, wherein:
the extracting the rate values from the rates table type includes extracting header information and body cell information;
the mapping comprises the at least one of the proximity constraint or the alignment constraint between text in the one or more headers to a respective body cell; and
the mapping comprises placing the header information and body cell information into the structured format.

16. The computer program product of claim 15, further comprising providing an output of the header information and body cell information into a JSON format.

17. The computer program product of claim 11, wherein the program instructions are further executable to:
classify text outside the first table and the second table to identify a domain of the unstructured document;
determine that the first table corresponds to the rates table type based at least in part on the domain;
determine a plan type based on the text outside the first table and the second table; and
output an indication of the plan type in association with the extracted rate values on the graphical user interface.

18. A system of document extraction, comprising:
a processor, a computer readable memory, one or more computer readable storage media, and program instruction collectively stored on the one or more computer readable storage media, the program instructions, by the processor, executable to:
train using training datasets comprising a plurality unstructured tables as inputs, one or more deep learning multi-modal models to detect tables with unstructured layouts in digitized documents, and to classify the detected unstructured tables as rates tables or non-rates tables based on a content of the detected unstructured tables;
identify, using the trained one or more deep learning multi-modal models, tables comprising different formatting and different content within pages of an unstructured, digitized document by determining bounded boxes with coordinates for the tables based on the formatting and the different content, wherein the tables comprise unstructured layouts;
classify, using the one or more deep learning multi-modal models, the identified tables into different table types by using the bounded boxes and the different content as inputs to the one or more deep learning multi-modal models for determining a context of the digitized document, wherein a first table type and a second table type of the different table types are an output from the one or more deep learning multi-modal models according to the context of the digitized document, wherein the first table type corresponds to rates tables, and wherein the second table type corresponds to non-rates tables;

detect, using the one or more deep learning multi-modal models, data to be in header cells of only the first table type of the different table types by discriminating data within body cells and header cells using the bounded boxes of the tables, the different content, and the different formatting, wherein at least one content and at least one formatting are excluded based on at least one table classified as the second table type of the different table types, wherein detecting the header cells comprises identifying text in different table cells and grouping the text from the different table cells together into at least one header cell in a combined table as a third layout;

extract the data from within the body cells and the header cells of the first table type corresponding to the rates tables that correspond to content associated with a structured format, the content comprising at least a portion of rate values;

map, using spatial heuristics based on the different content within the bounded boxes associated with the first table type, the extracted data of the body cells to the third layout and the header cells to provide a relationship between the data from within the body cells and the header cells, using a nearest identified element with the header cells by minimizing geometrical distance between the extracted data and the header cells according to at least one of proximity constraint or alignment constraint;

configure a graphical user interface with the extracted rate values mapped to the third layout using the spatial heuristics and according to the at least one of the proximity constraint or the alignment constraint; and provide, for presentation on a display device, the graphical user interface of the third layout in a structured format including coordinate of extracted data from the digitized document.

19. The system of claim 18, wherein:

the extracting discards header data or entire portions of the table that associates with a non-rates table type;

the mapping comprises using spatial relationships between the header cells and the body cells.

* * * * *